May 18, 1937.  A. L. THURSTON  2,080,448
DIRECTION FINDER
Filed June 28, 1934  4 Sheets-Sheet 1

FIG.1  ARTHUR L. THURSTON
INVENTOR

BY
ATTORNEY

ARTHUR L. THURSTON
INVENTOR

BY Samuel Ostrolenk
ATTORNEY

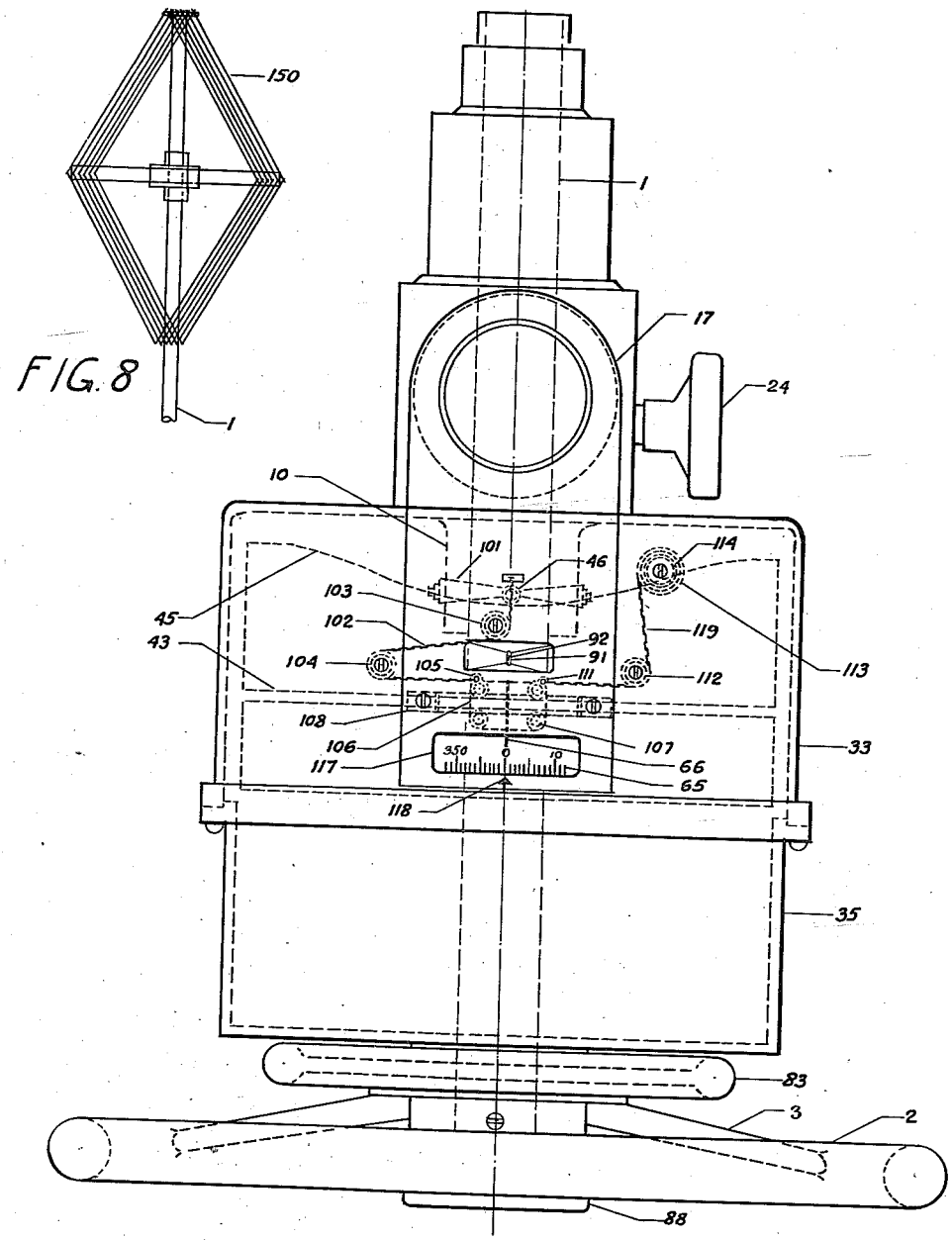

May 18, 1937.                A. L. THURSTON                2,080,448
                              DIRECTION FINDER
                           Filed June 28, 1934           4 Sheets-Sheet 4
FIG. 7
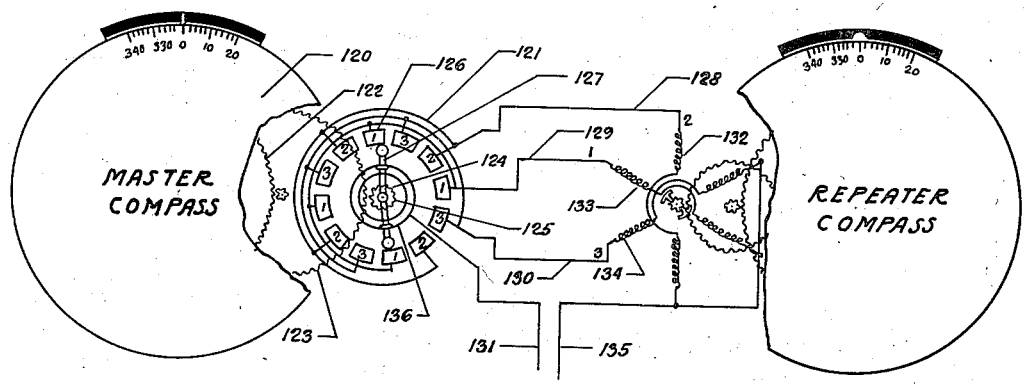
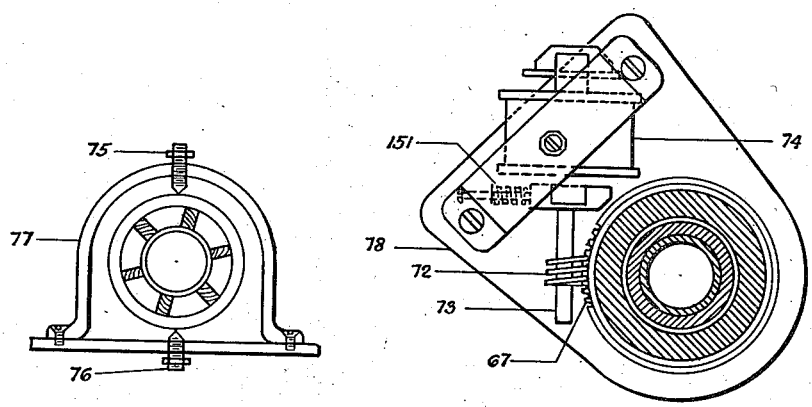
FIG. 6                              FIG. 5
ARTHUR L. THURSTON
INVENTOR
BY  *Samuel Ostrolenk*
ATTORNEY Patented May 18, 1937

2,080,448

UNITED STATES PATENT OFFICE 2,080,448

DIRECTION FINDER

Arthur L. Thurston, Wantagh, N. Y., assignor to Airplane and Marine Direction Finder Corporation, Lindenhurst, N. Y., a corporation of Delaware Application June 28, 1934, Serial No. 732,851

10 Claims. (Cl. 250—11)

My invention relates to apparatus for and methods of operating directional systems, and more particularly relates to apparatus for and methods of operating directional systems used on crafts, such as vessels, airplanes, and the like.

Direction finders have heretofore been used for indicating the line of direction to a transmitting station. The general operation, as is well known, consists in picking up a signal of a transmitting station and rotating a directional antenna until either a maximum or a minimum signal strength is indicated on an indicator connected through a radio receiver circuit to the antenna. The minimum signal corresponds to the position of the antenna, in which its plane is perpendicular to the line of direction of the transmitting station, and the maximum signal corresponds with a position of the antenna in which the plane of the antenna falls in the line of direction of the transmitting station.

A scale is connected to and rotates with the directional antenna, preferably of the loop type, to indicate by the scale reading opposite a pointer the "off-bow" angle of the antenna when either the maximum or minimum signal is received, and thereby indicating the line of direction to the transmitting station. Such an arrangement is disclosed in copending application, Serial No. 521,654, filed March 10, 1931.

As shown in this copending application, the scale can be shifted to directly indicate the line of direction of the transmitting station with respect to the keel line of the ship or to true north. This is accomplished by first rotating the antenna until its plane is perpendicular to the keel line of the vessel. The zero on the scale is then opposite the pointer.

The scale is then rotated with respect to the loop until its reading corresponds with the compass or true course of the vessel. When now the loop is rotated until a minimum signal is received, the position of the loop with respect to the magnetic or geographical north is obtained. As long as the vessel continues on the same course, such continued course readings may be obtained. If, however, the vessel changes its course, the above described adjustments must be repeated.

My invention contemplates a novel directional system and methods of operating the same in which a gyro compass directly controls the angular position scale, described above, with respect to the loop, and automatically adjusts its position to at all times correspond with the course of the vessel so that the line of direction to a transmitting station is directly obtained in degrees from the true north.

Accordingly, an object of my invention is to provide novel apparatus for and methods of operating direction finders.

A further object of my invention is to provide novel apparatus for and methods of automatically directly indicating the line of direction to a transmitting station with respect to the magnetic or geographical north.

Another object of my invention is to provide novel apparatus for and methods of directly controlling a direction finder in accordance with a compass.

Another object of my invention is to provide novel apparatus for and methods of automatically synchronizing a direction finder with a compass.

Still a further object of my invention is to provide novel means for controlling a direction finder in accordance with the readings of a gyro-compass.

There are other objects of my invention which, together with the foregoing, will appear in the detailed description which is to follow in connection with the drawings, in which;

Figure 3 is a front plan view of Figure 1.

Figure 5 is a top view of the repeater motor and worm gears.

Figure 6 is a diagrammatic view of the repeater motor.

Figure 7 is a circuit diagram of the electrical system used in my invention, and;

Figure 8 is a view of the loop antenna.

Figure 1:
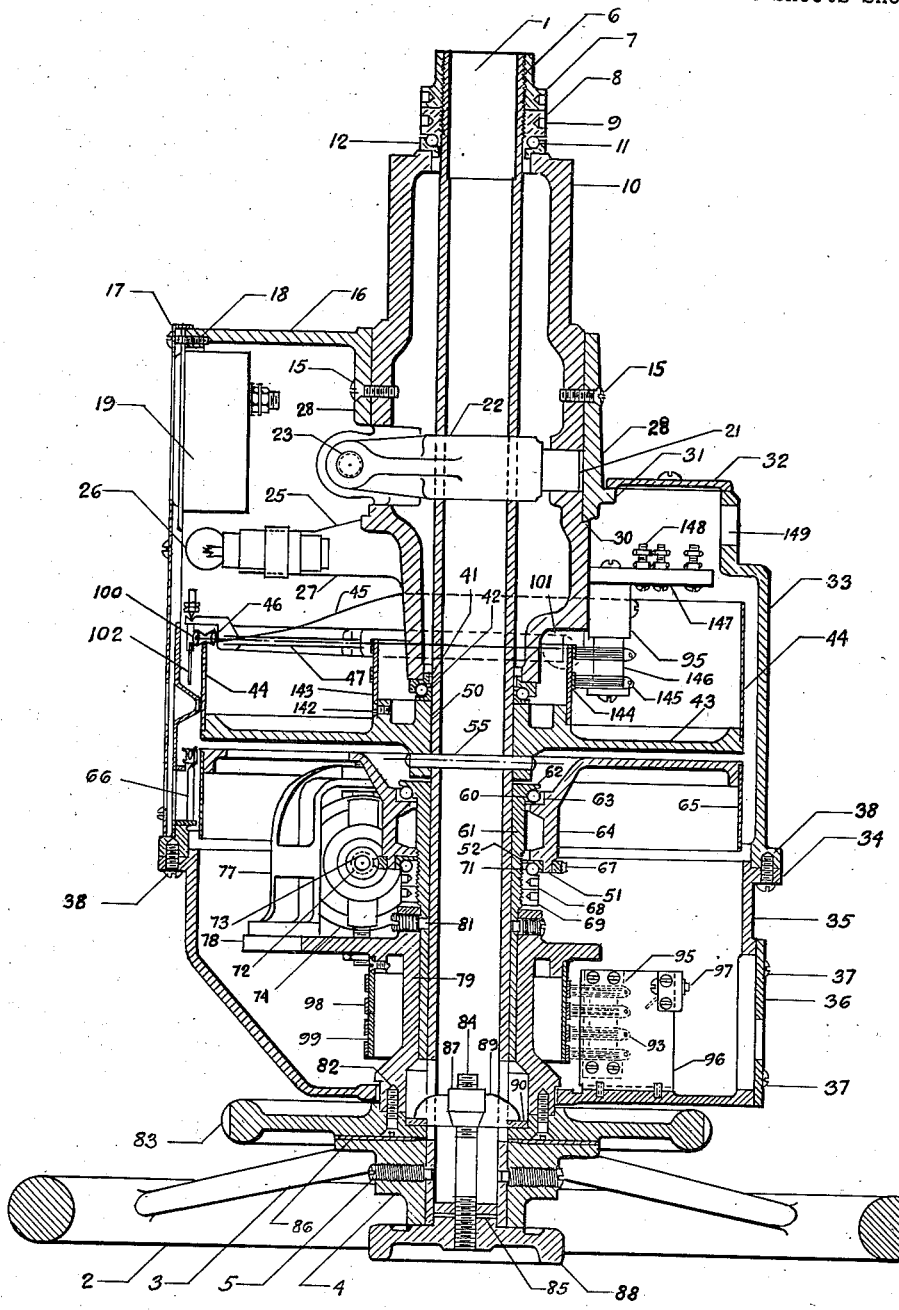
Figure 1 is a sectional elevation of a preferred form of my invention.

In Figure 1, the vertical shaft 1 is shown suitable for carrying a loop antenna to be rotated therewith. The antenna, which may be of any well known construction, is preferably a loop-antenna, or a combination of loop antenna of suitable design adapted to receive radio signals which are then transmitted through a suitable receiving set to any well known form of indicator, either of the audible or visible type or both.

Secured at the lower end of shaft 1 is a loop wheel 2 having ribs 3 and hub 4 secured to the shaft 1 by means of the set screws 5. Near its upper end, the loop shaft 1 is provided with external threaded section 6 which engages the internal threaded sections of adjusting members 7 and 8 supported on the cylindrical frame 10 through ball bearings 11 and ring 12. Shaft 1 is thus supported by means of the ball bearings 11 for free rotation with respect to the jacket 10.

By turning member 8 on its threads, a vertical adjustment of the shaft 1 for purposes to be described hereinafter can be obtained. After such vertical adjustment of loop shaft 1 has been made, this adjustment is locked by member 7 secured tight against member 8 by the aid of pins inserted in indentations 9.

The ring 12 is provided with shoulders resting on the jacket 10, which in turn depends in any well known manner, such as by means of brackets or the like, from any suitable supporting structure.

Secured across the front of jacket 10 by means of screw 15, is an upper casing 16 carrying a front plate 17 secured thereto by means of the screw 18. A sleeve 28 forms an integral part of the casing 16 and fits over jacket 10. Mounted in the casing chamber formed by the casing 16 and front plate 17 is an indicating instrument, preferably a minometer 19 with its front scale 20 visible through an opening in the front plate 17, as shown. Minometer 19 is connected to the output of a receiver (not shown), the input of which is connected to the antenna. The front plate 17 is also provided with other openings which will be described in more detail hereinafter, through which the direction finder scale and the loop zero reference point is visible.

Suitably supported on the frame 10 by means of a bracket 25 is a lamp 26 mounted in a socket provided with proper electrical contacts 27 for flooding the interior of this chamber with light to make the indicators therein visible through the openings, to be described.

Figure 2:
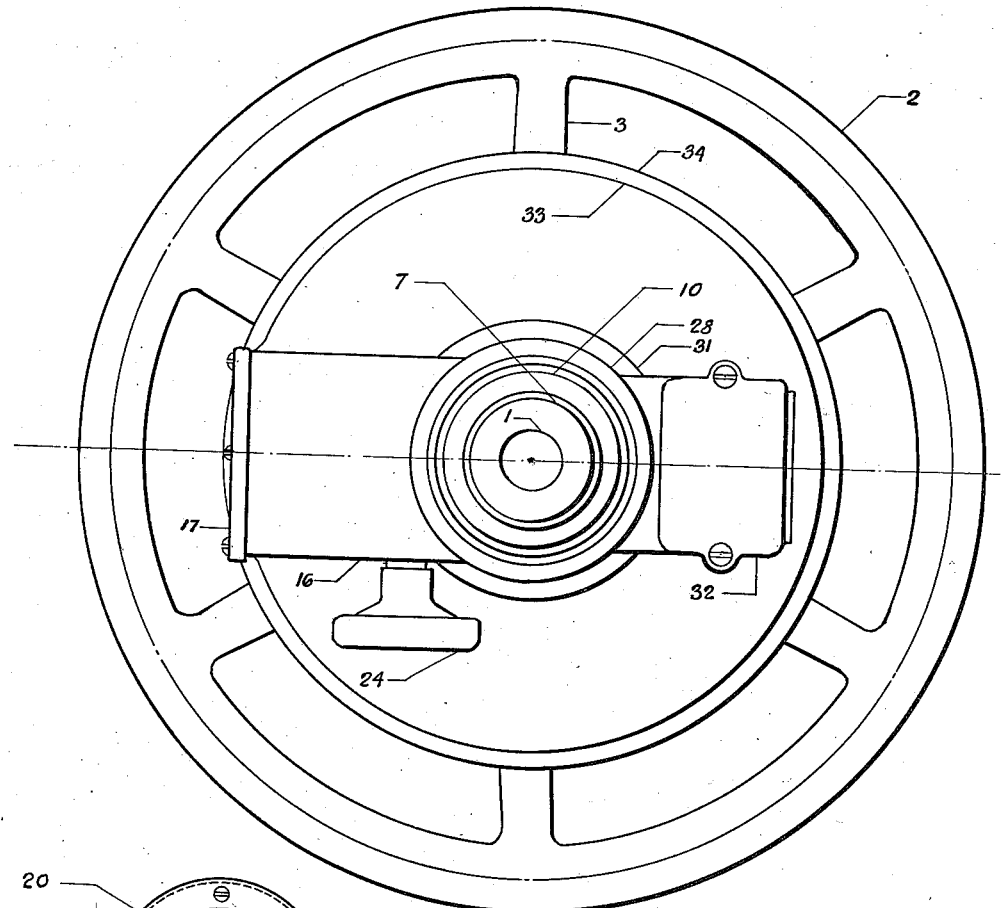
Figure 2 is a top view of Figure 1.

On the opposite side of the frame 10, the sleeve 28 rests on the shoulders 30 projecting from member 10. Sleeve 28 covers a recess 21 in which is mounted member 22 comprising two semi-cylindrical members fitting around the shaft 1. An adjusting screw pin 23 carrying a knob 24, shown in Figure 2, extends through the two semi-cylindrical members. By turning the knob, the two members may be tightened around shaft 1, locking it in position, or it may be loosened to permit free rotation of shaft 1.

Sleeve 28 is provided at its lower end with a horizontally extending lug 31 supporting a cover plate 32, one edge of the opposite end of which is supported on a back jacket 33. Jacket 33 rests on and is secured by means of screws 38 to a circular protruding shoulder 34 formed on the cylindrical lower casing 35. Casing 35, in turn, carries a cover plate 36 removably secured thereto by means of screws 37, thus permitting, when removed, access to the lower interior section.

This entire assembly, that is, casings 16 and plate depending therefrom, cover 32 and jackets 33 and 35, is supported, as will now be clear, through the frame 10 and a bearing ring 41 providing a chamber for ball bearings 42 on the hub sections 50 of a disk 43 rigidly secured to shaft 1 for rotation therewith.

Disk 43 has around its outer circumferential edge a card 44 having its upper surface cammed as shown at 45, the function of which will be described hereinafter. After the frame 10 and the depending parts therefrom have been slipped into place over the shaft 1 so that the lower end of the frame 10 rests on the circular shoulders formed on the disk 41 and the upper disk 12 has been in turn inserted over the shaft 1 and is resting on the upper shoulders of the frame 10, the member 8 is secured, gradually adjusting the vertical position of the shaft 1 until the hub 50 and disk 41 lightly enclose the ball bearing chamber, permitting a free rotation of the shaft 1 with respect to the frame 10.

Secured to cam holder 43 by means of a screw 142, is an insulated collar 143 on which are mounted collector rings 144 for conducting current from the antenna 150 to the radio receivers. The brushes 145 that wipe over these rings are secured to a brush carrier 146 depending from the arm 147 which is connected to jacket 10. Arm 147 also carries a number of terminal contactors 148 to which are connected leads coming through opening 149 in jacket 33.

Loosely mounted on the lower end of the loop shaft 1 is a second shaft 61 having shoulders 62 providing a ball bearing surface for the ball bearing 60 with the ring member 63 carried on a disk 64. The disk 64 is indented around its circumferential edge for supporting a scale 65, preferably divided into 360° and rotating with shaft 1 past a pointer 66 through an opening in the front plate 17.

Disk 64 is provided with a lug 51 fitting securely between a ring member 52 and a worm gear 67, all rigidly secured to each other and rotatable together. The ring member 52, together with the cylindrical member 68, form a ball bearing surface for the ball bearing 71. Members 68 and 69, having internal screw threads, are threaded on the outer screw threads of the shaft 61 to permit vertical adjustment with respect thereto. By screwing the members 68 and 69, shaft 61 is raised until it exerts sufficient pressure against ball bearings 71 to permit free rotation of disk 64 with respect to shaft 61. The worm gear 67 will then mesh with worm 72 mounted on and rotatable with motor shaft 73 of a motor 74. A spring 151 (Figure 5) presses the worm against the worm gear, thus assuring perfect contact.

The motor 74, details of which will be described hereinafter, is pivoted at 75 and 76 (Figure 6) on a framework 77 mounted on a platform 78 (Figure 1). The platform 78 is a part of the bracket member 79 secured by means of screws 81 to the outer shaft 61 for rotation therewith and is secured by means of screws 82 to a synchronizing wheel 83. Synchronizing wheel 83 is normally secured to and rotatable with the loop wheel through a bolt 84 threaded on its upper and lower ends and provided with a winged nut 87. The wings 89 of the nut project through corresponding holes of the shaft and overlie a washer 99 surrounding the shaft on the upper surface of the wheel 83. Bolt 84 is attached by means of pin 85 to a handle 88 which projects with a portion of reduced diameter into the shaft 1.

The means just described provide for the engagement or disengagement of the loop wheel 2 and synchronizing wheel 83 in the following way: With the handle 88 in the position shown, the wheel 2 presses against the wheel 83 and engages the latter by friction through the medium of circular plate 86. If the handle 88 is turned in one direction—in the drawings shown counterclockwise—the bolt 84 will partly unscrew with the nut 87 and release the pressure exerted by wing nut 89 and washer 90 on wheel 83. The latter is now free for manual rotation and can be brought into any angular position relative to the wheel 2 and thus relative to the antenna secured thereto.

In this condition, the synchronizing wheel 83 may be turned, carrying with it the scale 65 which is now adjusted opposite the pointer of reference until the reading corresponds with vessel's master compass reading to be described. Then the bolt 84 is tightened by rotation in a clockwise direction until the loop wheel 2 is secured to and rotates with the synchronizing wheel 83 and the mechanism attached thereto.

Normally when the navigator desires to take bearings, he will rotate his loop wheel 2 in turn rotating the shaft 1 and the loop antenna attached thereto until a zero reading is indicated on the minometer. This is based, of course, on the assumption that the null method for bearing indication is being used. If, on the other hand, maximum readings are being taken, the loop will be rotated until the reading is maximum. As the wheel 2 is rotated it will carry the scale with it past the pointer of reference 66 and a reading will be obtained indicating the angular position of the loop when either maximum or minimum signal is obtained on the minometer.

A disk 43 is fixedly mounted on the antenna shaft 1 by means of a hub 50 and a fastening pin 55. The disk 43 has suitably mounted, at its periphery, a cylindrical card 44 having a sinuous upper edge constituting a cam 45.

The cam 45 and the means cooperating therewith, hereafter to be explained, are provided to take care of electromagnetic or other influences present on the craft, which cause the direction indicated by the position of the antenna to deviate from the correct direction of a transmitting station, the direction of which is to be determined. Such influences are mainly due to iron masses on the craft. The angular deviations between the true direction of the transmitter and the apparent direction indicated by the position of the antenna can be determined for the particular craft on which the direction finder is mounted once for all by taking observations from a transmitter of known direction and turning the ship around a complete circle, thus determining for every angular position of the antenna the deviation between the true and apparent direction.

These deviations, according to my invention, are platted on the card 44, whereby the length of the graph corresponds to the circumference of the disk 43 and the ordinates represent the angular deviations—which may be clockwise or counter-clockwise, and are correspondingly plotted above or below a selected zero line—in a scale of proper relation to the parts with which the graph is to cooperate. The resultant curve is of a sinuous character and when the card 44 is cut out along this curve and secured to the graph-holder 43 in the form of a cylinder, its upper edge constitutes the cam 45 for a roller 46 thereon.

As is well understood, the graph-card 44 is so affixed to the graph-holder 43 that for any selected angular position of the antenna, the roller 46 rides on the portion of the cam the height of which corresponds to the deviation caused by the local influences for the selected angular position of the antenna.

Figure 4:
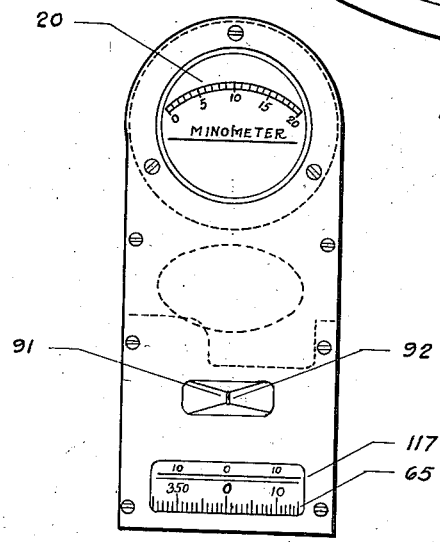
Figure 4 shows a view of the front plate of Figure 1 removed.

In case I use minimum signal strength observations for direction finding, which I prefer to employ, the zero is so selected that its height corresponds with the correction required when the antenna plane is perpendicular to the fore and aft center line of the craft. A narrow vertical slot 91 (Figure 4) is provided on the front cover plate 17, while the cylindrical card 44 is provided with an index arrangement to be opposite the aperture 91 when the roller 46 comes to ride on that portion of the cam 45 which corresponds to the fore and aft line of the craft.

The roller 46 which rides on cam 45 is loosely mounted on a pin 100 of a lever 47. The lever 47 is fulcrumed by means of a two-arm yoke at its rear end on a member 101 depending from frame 10. To an extension of the lever 100 is secured a cord 102 which passes around two pulleys 103 and 104 (Figure 3) mounted on the inner wall of front plate 17, the cord being attached, with its other end, to an ear 105 projecting from an upper corner of plate 106. The plate 106 is provided, on its upper and lower edges, with inward projecting rollers 107 riding on the upper and lower edges of a rail 108 located behind the plate 106 and affixed to the inner wall of the plate 17. The plate 106, as will be hereafter explained, is adapted to be shifted along the rail 108. On the upper corner the plate 106 is provided with an ear 11 to which is attached one end of a cord 119 passing around a pulley 112 mounted on the inner wall of the plate 17, and thence around a drum 113 which is mounted on the inner wall of the plate 17 and has within it a convolute spring 114. The plate 106 is provided, on its front side, with a downward extending pointer 66 which cooperates with the cylindrical scale 65 calibrated in degrees.

Opposite the plate 106, a window 117 is provided in the wall of the front plate 17 which permits a portion of the scale 65 to be observed by the operator. Below the center of window 117 the casing carries an index mark 118, indicating the plumb line of the craft or any affixed direction relative thereto.

As the antenna is rotated, the pointer 66 moves along scale 65 relative to a fixed index 118, and, for any given position of the antenna, will be shifted relative to the index 118 by an amount which is equal in degrees of the scale 65 to the amount of rotation of the antenna (+) or (−) the deviation caused by the local influences for this position of the antenna.

With the antenna assuming a position perpendicular to the fore and aft of keel line (for observation of minimum signal strength), as shown in Figure 1, the roller 46 engages a point of the cam 45 which falls on the zero line of the graph. The index 92 is visible through its window 91 and in this position the pointer 66 points to the plumb line index 118. If the antenna is rotated into a position for which the local influences cause a clockwise deviation from the true direction, the cam 45 will engage the roller 46 with a correspondingly higher portion. The roller 46, being lifted, exerts a pull on the cord 102, and causes the latter to move the plate 106 and the pointer 66 towards the left relative to index 118 by an amount which, expressed in degrees of the scale 65, is equal to the angular deviation caused in the clockwise direction by the local influence.

On the other hand, if the antenna is moved into a position for which the local influences cause a counter-clockwise deviation from the true direction, a cam portion which falls below the zero line engages the roller 46 and the plate 106 under the action of the spring 114, is moved by the cord 102 towards the right, thereby moving the pointer to the right relative to index 118 by an amount which, expressed in degrees of the scale 65, is equal to the counter-clockwise deviation caused by the local influences. If a bearing is to be taken with respect to the bow of the craft; that is, with respect to the fore and aft center line, the procedure is the following:

The antenna is brought into its zero position, which, in case the bearings are taken by determining the minimum signal strength, corresponds to the position in which the plane of the antenna is perpendicular to the fore and aft or keel line of the craft. To this end, the antenna is rotated by means of the wheel 2 until the index 92 of the correction graph 45 appears through window 91.

The synchronizing wheel 83 is then unlocked from antenna wheel 2 by unscrewing the knob 88 and the synchronizing wheel 8 rotated until the zero of scale 65 comes in juxtaposition with the index. The synchronizing wheel 83 is then again locked to the wheel 2 by means of the knob 88 and the plate rotated with the antenna by means of wheel 2 until minimum signal strength is observed. In this position, the pointer 66 will indicate on scale 65 the correct angle which the direction of the transmitting station encloses with the fore and aft center line of the craft.

It should be noted that the corrections for the deviations caused by local influences are made automatically, due to the shifting of the pointer 66 with regard to the index 118.

In case the bearing is taken in respect to the true North Pole, instead of the fore and aft center line of the craft, the procedure has been as follows heretofore:

The antenna is again brought into its zero position, as previously described. The wheel 83 is unlocked from the wheel 2 and the antenna. A reading is taken on the master gyro compass of the craft, determining the angle which the fore and aft center line of the craft encloses with the direction of the true North Pole and the wheel 83 is rotated until its scale 65 opposes the index to give a corresponding reading. Wheel 83 and wheel 2 are now locked and the antenna rotated together with the wheel 83 until minimum signal strength is observed. The reading indicated by pointer 66 on scale 65 gives the bearing in respect to the true North Pole.

Continued readings may be taken as long as the course of the craft remains the same. When, however, the craft changes its course, the scale 65 must be reset in accordance with the new direction. My invention contemplates an elimination of this difficulty by an automatic control of the scale 65 to change its position relative to the loop whenever the course of the vessel is changed.

This is accomplished by the motor 74, already briefly described, which functions as a repeater motor for a gyro-compass. Current to the windings of this motor is supplied through the brushes 93 wiping over collector rings 98. Rings 98 are mounted on a collar 99 secured to and rotatable with the hub of bracket 79 and are wiped over by the brushes 93 mounted on the brush carrier 95 depending from the angle 96 which is secured to the bottom of jacket 35. Angle 96 also carries a number of terminal contactors 97 to which the leads from the gyro compass motor are connected.

To this end, I have provided mechanism for rotating the scale under control of a gyro compass so that at all times it indicates the true course of the vessel with respect to the true north.

The detail electrical circuit is disclosed in Figure 7. As shown, the shaft of gyro compass 120 drives distributor 121 through the gear systems 122 and 123 and 124. The distributor 121 comprises a plurality of segments 126 and a brush wiper 127 mounted on the shaft 125 of the distributor 121. Every third segment is connected together, there being a total of twelve segments divided into four groups. Conductors 128, 129, and 130 extend from each group of segments and a common conductor 131 is electrically connected to the ring 136. Conductors 128, 129, and 130 are connected to individual pairs of windings 132, 133, and 134 on the repeater motor 74, the opposite terminals of which are connected together and extend to the supply line over conductor 135.

As is understood, the gyro compass is rotated on a shaft which points continually towards the true geographical north. As the vessel changes its course, the gyro compass shaft will move in azimuth to remain pointed towards the north; that is to say, its angle with respect to the keel line of the vessel will change. As the master compass moves in azimuth, the distributor brush wiper 127 moves over the commutator segments to selectively supply current to the three sets of windings 132 to 134 of the poles of the repeater motor in succession. Thus, for example, in the position shown, currents from the source will flow over conductor 131 to ring 132, thence over distributor brush 127 to segment 126, conductor 129 to windings 132 and over the common return conductor 135 to the source of energy. Winding 132 will thus be energized to move the armature of the motor into juxtaposition with this winding.

The soft iron core armature of the repeater motor therefore places itself between a pair of poles 132, then halfway between that pair and the next pair of poles and so on in such manner as to move the repeater motor and thence through the worm 72 and worm gear 67, the scale 65 to follow the master. Each step of the repeater motor is equivalent to minutes of arc on the scale 65.

Accordingly, with this arrangement, the reading on the scale corresponds to the position of the gyro compass.

I claim:

1. In a directional system, a directional antenna; a scale; a compass; a repeater motor controlled by said compass, said repeater motor being connected to said scale for operating said scale in accordance with the operation of said compass; and a mechanical connection between said directional antenna and said scale whereby said scale is controlled in accordance with the position of said directional antenna while maintaining said repeater motor control of said scale.

2. In a direction finder system, a directional antenna; a scale; a pointer cooperating with said scale; means for producing a movement of said scale relative to said pointer to indicate the angular position of said directional antenna; a compass; a repeater motor electrically controlled by said compass; and means whereby said motor produces a similar movement of said scale relative to said pointer while maintaining said first mentioned control of said scale in accordance with the angular position of said directional antenna whereby said scale at all times indicates the angular position of said directional antenna with respect to the true north.

3. In a direction finder system, a directional antenna; a scale; a pointer cooperating with said scale; means for producing a movement of said scale relative to said pointer to indicate the angular position of said directional antenna; a gyrocompass; a repeater motor electrically controlled by said gyro-compass; and means whereby said motor produces a similar movement of said scale relative to said pointer while maintaining said first mentioned control of said scale in accordance with the angular position of said directional antenna whereby said scale at all times indicates the angular position of said directional antenna with respect to the true north.

4. In a direction finder system, a rotatable loop antenna; a shaft and driving wheel therefor; a compass; a repeater motor mounted on said shaft for rotation therewith and electrically connected to said compass; a rotatable scale and a cooperating fixed pointer for indicating the angular position of said antenna; and means connecting the motor and the scale for maintaining said scale in oriented position to indicate the angular position of said antenna with respect to the true north.

5. In a direction finder system, a rotatable loop antenna; a shaft and driving wheel therefor; a gyro-compass; a repeater motor mounted on said shaft for rotation therewith and electrically connected to said gyro-compass; a rotatable scale and a cooperating fixed pointer for indicating the angular position of said antenna; and means connecting the motor and the scale for maintaining said scale in oriented position to indicate the angular position of said antenna with respect to the true north.

6. In a direction finder system, a directional antenna; a shaft and manual driving means therefor; a rotatable scale and a cooperating fixed pointer mounted on said shaft for rotation therewith; a motor mounted on said shaft for rotation therewith; and a compass electrically connected to said motor for operating said motor in accordance with the operation of said compass; and means connecting the motor and the scale for maintaining said scale in oriented position to indicate the position of said antenna with respect to the true north.

7. In a direction finder system, a directional antenna; a shaft and manual driving means therefor; a rotatable scale and a cooperating fixed pointer mounted on said shaft for rotation therewith; a motor mounted on said shaft for rotation therewith; and a gyro-compass electrically connected to said motor for operating said motor in accordance with the operation of said gyro-compass; and means connecting the motor and the scale for maintaining said scale in oriented position to indicate the position of said antenna with respect to the true north.

8. In a directional system; a directional antenna; a scale; a pointer cooperating with said scale; manually operable means for producing a relative movement between said pointer and said scale and to simultaneously move said directional antenna for indicating the angular position of said antenna on said scale; a compass; and means for producing a similar relative movement of said scale and pointer responsive to the movement of said compass.

9. In a directional system for vessels having thereon a directional antenna, a directional indicating means comprising a scale and a pointer cooperating with said scale; manually operable means; a driving connection between said manually operable means, said antenna, and said indicating means whereby as said antenna is rotated a corresponding relative movement between said scale and pointer is obtained for indicating the angular position of said antenna; a compass; a motor; means whereby said compass operates said motor in accordance with the direction of travel of said vessel; a driving connection from said motor to said directional indicating means for rotating said directional indicating means for producing a similar relative movement between said scale and pointer responsive to the movement of said compass, whereby said indicating means at all times indicates the angular position of said directional antenna with respect to the true north.

10. In a direction finder system, a directional antenna; a scale; a pointer cooperating with said scale; means for inducing a movement of said scale with respect to said pointer to indicate the angular position of said directional antenna; a compass; a repeater motor electrically controlled by said compass; means rotatable with said scale for rotating said repeater motor in a path coaxial with said scale; and a worm gear driving connection between said motor and said scale whereby said motor produces a rotation of said scale with respect to said pointer while maintaining said first mentioned control of said scale in accordance with the angular position of said directional antenna whereby said scale at all times indicates the angular position of said directional antenna with respect to the true north.

ARTHUR L. THURSTON.